United States Patent [19]
Bodamer

[11] Patent Number: 6,163,858
[45] Date of Patent: Dec. 19, 2000

[54] DIAGNOSTIC METHODOLOGY FOR DEBUGGING INTEGRATED SOFTWARE

[75] Inventor: Roger Bodamer, Mountain View, Calif.

[73] Assignee: Oracle Corporation, Redwood Shores, Calif.

[21] Appl. No.: 09/092,856

[22] Filed: Jun. 8, 1998

[51] Int. Cl.[7] .................................................. G06F 15/40
[52] U.S. Cl. ............................................. 714/34; 717/3
[58] Field of Search ............................... 714/25, 32, 35, 714/37, 38, 34, 33; 717/3, 8

[56] References Cited

U.S. PATENT DOCUMENTS

| | | | |
|---|---|---|---|
| 4,802,165 | 1/1989 | Ream | 714/38 |
| 4,819,233 | 4/1989 | Delucia et al. | 714/4 |
| 5,197,005 | 3/1993 | Shwartz et al. | 707/2 |
| 5,357,452 | 10/1994 | Pio-di-Savoia et al. | 702/108 |
| 5,390,325 | 2/1995 | Miller | 714/38 |
| 5,437,027 | 7/1995 | Bannon et al. | 707/103 |
| 5,561,111 | 10/1996 | McKeeman et al. | 714/38 |

OTHER PUBLICATIONS

Hanly, Jeri. "C program design for engineers" Addison–Wesley Publishing Company, Inc. 1995. pp. 64–68, 306–316.

"Microsoft Press Computer Dictionary: Third Edition" 1997. pp. 166, 198, 199, 285, 338.

*Primary Examiner*—Robert W. Beausoliel, Jr.
*Assistant Examiner*—Bryce Bonzo
*Attorney, Agent, or Firm*—McDermott, Will & Emery

[57] ABSTRACT

Software fault diagnosis is performed for a faulty base software application that is integrated with external routines by generating substitute routines using the same arguments and parameters of the external routines. The substitute routines are linked into the base software in place of the external routines. If base software application with the substitute routines runs without error, then the external software is suspected for the source of the fault. On the other hand, if the base software with the substitute routines still crashes, then the base software is suspected. The probable source of porting errors can be determined by running the base software with the substitute routines on two or more incompatible platforms and determining which platforms exhibit the fault.

22 Claims, 5 Drawing Sheets

DIAGNOSTIC METHODOLOGY FOR DEBUGGING INTEGRATED SOFTWARE

FIELD OF THE INVENTION

The present invention relates to computer systems and more particularly to distinguishing and identifying the location of faults in software applications integrated with external routines.

BACKGROUND OF THE INVENTION

Many software vendors now provide facilities that enable their customers to extend or customize their software applications by integrating external routines designed and developed by the customers themselves or by third-party software developers. For performance reasons, these external routines are usually coded in a third-generation language (3GL) such as C or C++, compiled into native machine language instructions specific to a particular platform (processor type and operating system), and archived into a library. The vendor's base software is then linked with the library to integrate the external routines contained in the library with the base software. In recent years, dynamic link libraries (DLLs) have become popular, whereby external routines in a DLL are linked into the base application at start-up or as needed during the execution.

For example, one such software system is disclosed in the commonly assigned, co-pending U.S. patent application Ser. No. 08/880,326 entitled "Apparatus and Method for Calling External Routines in a Database System" filed on Jun. 23, 1997 by Jacco Draaijer, Roger Bodamer, and Eric Voss, the contents of which are hereby incorporated by reference. Therein, users have the capability of writing external procedures in a 3GL and compiling them to be called from within a database system. Accordingly, a database user can use a database implementation language, such as SQL (Structured Query Language) or a procedural language extension such as PL/SQL, available from Oracle Corp. of Redwood Shores, Calif., to call the foreign 3GL external procedures as if they were internal procedures or functions. The external functions are archived into a shared library such as a DLL and registered with the base software. At runtime, facilities associated with the base software dynamically load the shared library and invoke routines therein directly or indirectly via an external agent. Thus, users are able to invoke, from within the base database application, external software they have developed themselves in a 3GL language.

It is, of course, inevitable that at least some software applications contain runtime faults, which can crash and prevent the application from completing. For example, de-referencing an invalid pointer on some platforms causes a segmentation fault, which immediately halts execution of a program. On other platforms, this fault results in an invalid value being fetched from memory, thereby introducing a subtle error that may not become apparent until much later. A difficulty that arises with integrated software, however, is determining whether the fault lies with the external software or with the base software, because the fault typically does not become apparent until after the external software and the base software have been integrated. Thus, the job of debugging software is rendered very difficult (if not impossible) when the software developer is unable to even identify which software module actually contains the fault. This difficulty is exasperated because the developer of the external routine almost never has access to the base software source code and the base software programmer is unfamiliar with the implementation of the external routines. Thus, neither expert is proficient with the other's code, thereby leading one developer to suspect the other's code to be at fault.

A common conventional approach for determining the location of a crash-inducing software fault is to perform a detailed examination of a "core dump," produced on some platforms when a process is aborted by certain kinds of internal errors, such as a segmentation violation (a kind of memory error on virtual memory systems) or execution of an illegal instruction (typically caused, e.g., by a corrupted return address on the stack). A core dump contains the contents of the internal memory used by a process and typically includes the values of allocated virtual memory, user registers, and system registers such as a status register and program counter, often displayed as a raw collection of hexadecimal or octal numbers. A core dump is usually examined by an expert programmer with a symbolic debugger in conjunction with the source code for the external routines and the base software. Although the location of some faults might be ascertained by asking the symbolic debugger to trace the program stack, which identifies the routine in which the run-time fault manifested, other errors, such as a corrupted stack, are much more difficult to isolate to a specific module.

Examining a core dump, however, involves significant logistical difficulties, because the core dump is a very complicated and extremely large file. For example, the complexity of core dumps makes it difficult for a support person such as a help desk analyst to assist the customer over the telephone. Because core dumps commonly contain many megabytes of storage, it can take a significant amount of time to download the core dump from the customer's platform to a test computer on a compatible platform for debugging. In addition, symbolic debuggers typically require a copy of the external DLL and, preferably, the customer's source code, which the customer may be reluctant to disclose. Furthermore, not all platforms generate core dumps.

SUMMARY OF THE INVENTION

There is a need for a generalized approach for identifying the source of problems when external routines are integrated and linked to base software. There is also a need for an effective debugging tool for isolating integrated program faults without having to examine or download a core dump. Furthermore, there exists a need for an easy-to-use diagnostic methodology that can be used by a support person over a telephone.

These and other needs are met by the present invention, in which substitute routines are generated using the same arguments and parameters of the external routines and are linked into the base software as a replacement for the external routines. If the substitute routines can be successfully executed with the base software system, then the external software is suspected for the fault. On the other hand, if the base software with the substitute routines still crashes, then the base software is suspected.

The present invention can also be employed to identify the source of porting problems. If the base software integrated with the substitute routines crashes on two or more incompatible platforms, then the fault is likely to be generic to the base software. On the other hand, if the software only crashes on one of the platforms. then the platform-specific version of the software (i.e., the port) is under suspicion.

One aspect of the invention is a diagnostic method for debugging a computer application having linked therein an external routine. An arrangement of instructions, such as a substitute routine, is generated based on a declaration of the external routine. The arrangement of instructions is linked into the computer application in place of the external routine and executed by running the computer application on a computer system. A fault is checked for while running the computer application. The substitute routine may be configured to inspect, validate, and log the values of parameters passed into the substitute routine and configured to initialize the results of the substitute routine.

Still other objects and advantages of the present invention will become readily apparent from the following detailed description, simply by way of illustration of the best mode contemplated of carrying out the invention. As will be realized, the invention is capable of other and different embodiments and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and apparatus for software fault diagnosis are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
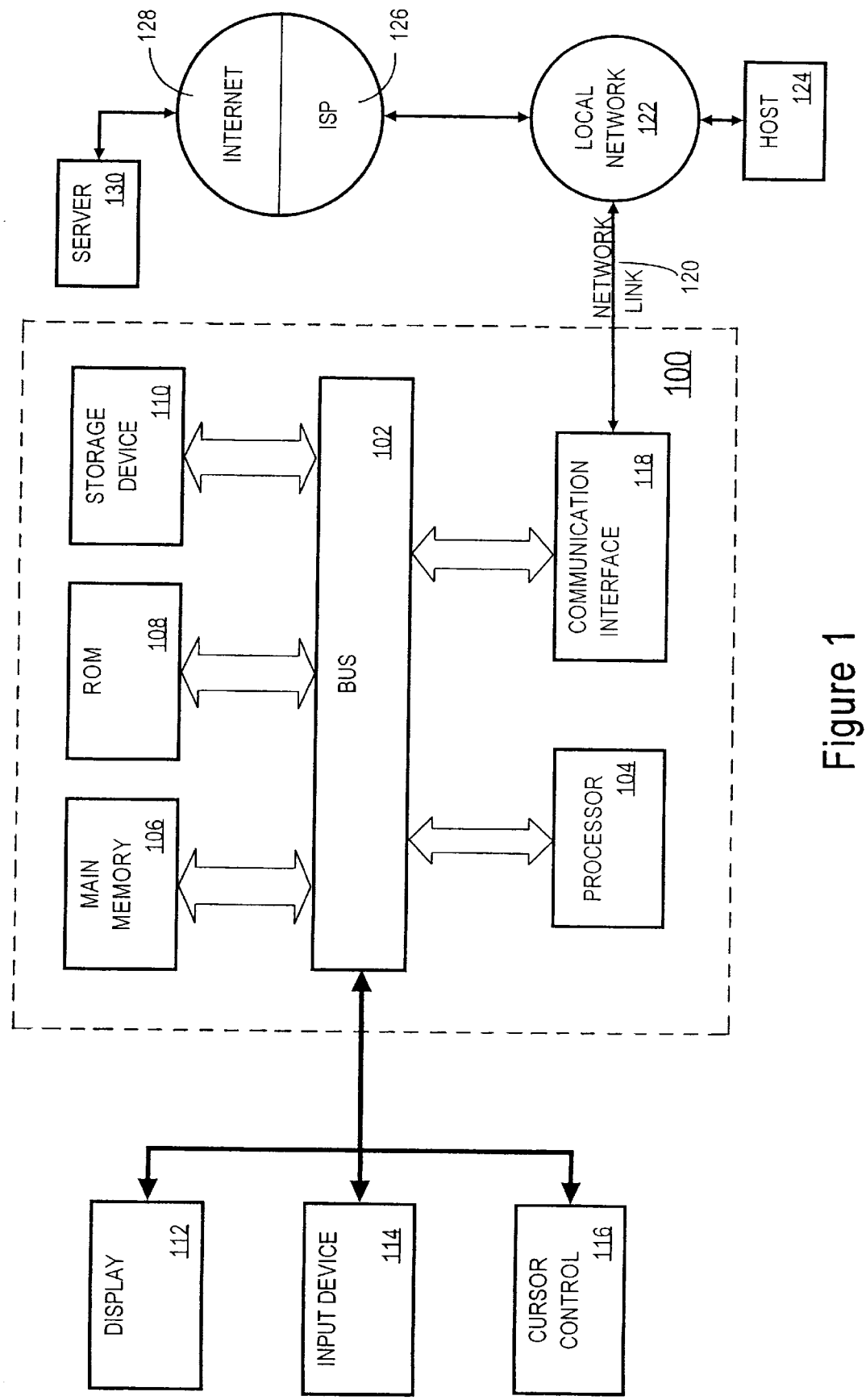
FIG. 1 depicts a computer system that can be used to implement the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for software fault diagnosis. According to one embodiment of the invention, software fault diagnosis is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for software fault diagnosis as described herein. The received code may be executed by processor 104 as it is received, and/or stored in storage device 110, or other non-volatile storage for later execution. In this manner, computer system 100 may obtain application code in the form of a carrier wave.

CALLING EXTERNAL ROUTINES

FIG. 2 illustrates an exemplary software system 200 that is capable of calling external routines from a base software module 202. In this example, the exemplary software system 200 is implemented as a relational database system and base software module 202 is implemented as a relational database server, although the present invention is applicable to other software systems capable of calling external routines. Database server 202 is configured to provide an interface to a client application 206 over an inter-process communication (IPC) mechanism 208 for accessing and manipulating data within a database 204, typically stored on a non-volatile medium, e.g., storage device 110. In this configuration, client application 206 furnishes a user-interface, employing display 112, input device 114, and cursor control 116, and high-level functionality provided, for example, by client routines 218. IPC mechanism 208 can be implemented and coordinated using techniques such as shared memory, pipes, semaphores, remote procedure calls (RPCs), process spawning, and the like.

According to one embodiment of the present invention, the base software is capable of calling trusted external routines 210 and untrusted external routines 212. Trusted external routines 210 execute in the same address space as the base software 202, and are therefore capable of crashing the base software process 202 if they contain a run-time error such as a segmentation or page fault. Thus, trusted external routines 210 are preferably validated by the vendor of the base software 202 or developed by a reliable third party. The base software process 202 can be protected from untrusted external routines 212 by executing the untrusted external routines 212 in a separate address space. In one embodiment, the base software process 202 spawns an agent process 214, which is linked with untrusted external routines 212. The agent process 214 and the base software process 202 communicate between themselves by an IPC mechanism 216.

Figure 2A:
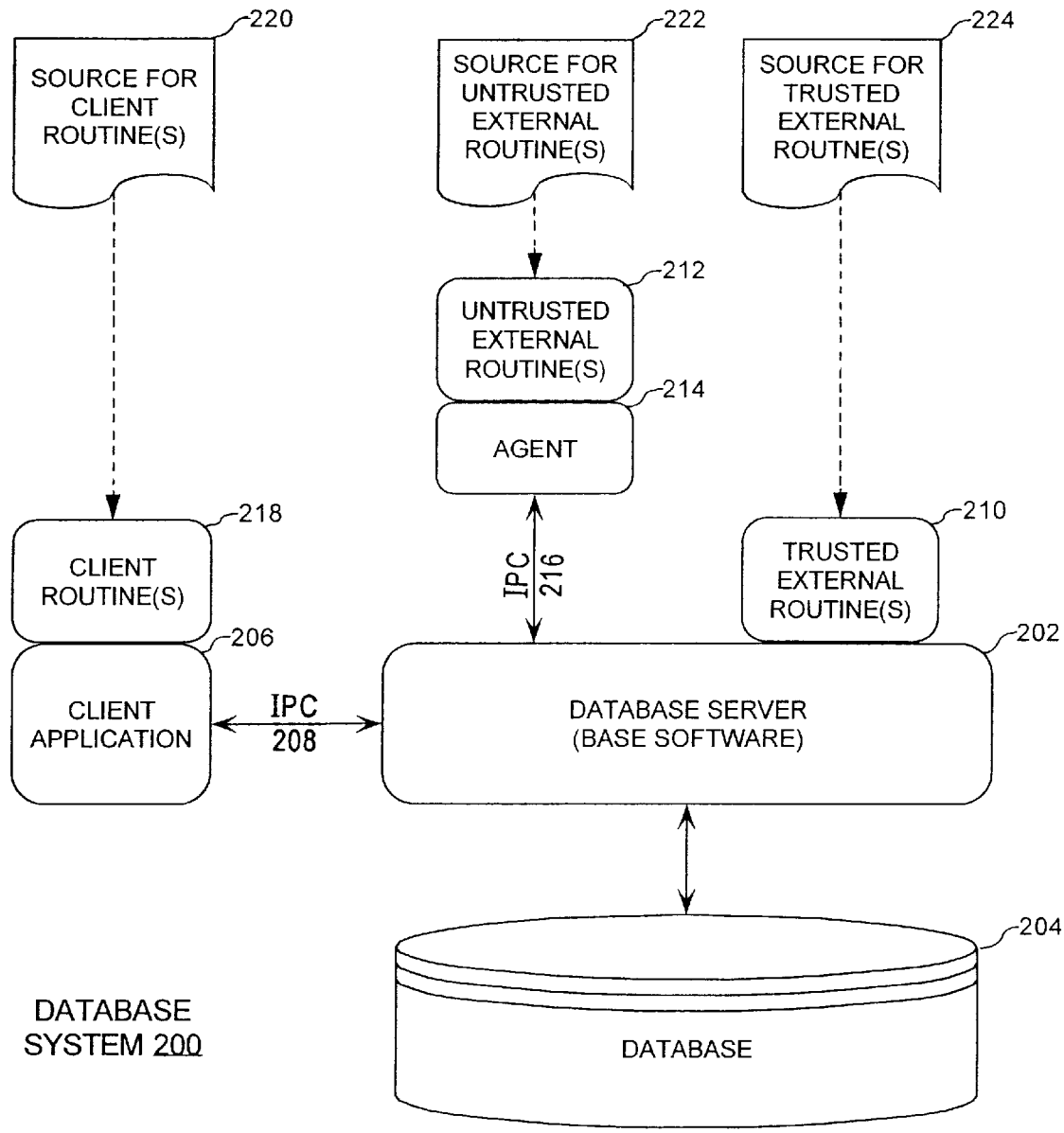
FIG. 2(a) illustrates an exemplary software system capable of calling external routines.

External routines 210 or 212 are ultimately invoked from client routines 218, which are developed by a third-party and linked into the client application 206 as shown in FIG. 2(a) or, alternatively, into base software 202. These client routines 218 are typically compiled from one or more source code files 220, written in a high-level language, such as C, C++, Pascal, Ada, FORTRAN, COBOL, any other 3GL language, or a 4GL language such as SQL (Structured Query Language) or PL/SQL, a procedural extension to SQL available from Oracle Corp.

To properly interface the external routines 210 or 212 with the client application 206, the source files 220 for the client routines 218 typically contain "declarations" of the external routines 210 or 212. A declaration of a routine is a "signature," or a string of characters, that specifies at least the name of the routine and may include the number, order, and type of parameters that are input into the routine (i.e., the "in-parameters") and the results the routine produces (the "out-parameters"). For example, a PL/SQL declaration of an external routine called "foo" that receives an integer called "a" as an in-parameter and produces an integer result in an out-parameter called "b" is: "create procedure foo (a in NUMBER, b out NUMBER) is external;". As another example, a declaration for the same external routine "foo" in the ANSI C programming language is: "extern void foo(int a, int *b);". In some implementations, such as with the so-called "K&R style" C programming languages, the declaration may omit the routine's parameters, e.g. "extern void foo();".

The source code files 220 are compiled by an appropriate compiler into one or more object code modules containing client routines 218 and optionally archived into a library. Similarly, the external routines 210 and 212 are also compiled by a compiler from source files 224 and 222, respectively, written in a high-level language, and archived into a library. The object code modules for client routines 218 and external routines 210 and 212 include arrangements of machine instructions for each routine and often contain unresolved external references to data or instructions outside of the object code module. In order to resolve the references, the object code modules are linked into the client application 206, base software 202, or agent 214 as appropriate.

Two forms of linking are common: static linking and dynamic linking. In static linking, a linker (or link editor) incorporates the object code modules into the client application 206 (or base software 202) and resolves all the external references before the client application 206 (or base software 202) is executed. In dynamic linking, the client application 206 (or base software 202) is configured to load the object codes modules, typically archived into a shared library such as a dynamic link library and resolve the external references at run-time.

At run-time, a user inputs, via input device 114 and/or cursor control 116, commands into client process 206, which translates the commands into a series of lower level requests that the database server 202 can readily handle. The lower level requests, which can include, for example, establishing a session, parsing a Structured Query Language (SQL) statement in to a "cursor," and executing the cursor, are communicated across IPC mechanism 208 to the database server process 202. The database server process 202 can be executing at the same site as the client process 206 or at another site in a common network.

In response, the database server process 202 executes instructions for causing the requested operations to be performed. Generally, the requested operations direct the database server process 202 to access, manipulate, or retrieve data stored in database 204. However, in some cases, the requested operation can involve some processing, especially for an execute cursor call, that must be performed by an external routine, developed by a customer, client, division, or other third-party. The results of the database server 202 operation are communicated back to the client process 206 via IPC mechanism 208 and, ultimately, to the user through display 112. In other examples, the base software module 202 can be configured to handle the user interface and other high-level functionality as well as lower-level operations.

If the process executing the external routine, i.e., the base software module 202 for a trusted external routine 210 and an agent 214 for an untrusted routine 212, fails when the external routine is invoked, then the source of that failure can be a programming error in the external routine 210 or 212 or a more subtle error in the base software module 202. For example, a common programming error for an external routine 210 or 212 is the result of using an incorrect declaration for the external routine 210 or 212 in the source files 220 for the client routines 218. In the example of an external routine "foo" with an in-parameter called "a" and an out-parameter called "b," there is likely to be a run-time fault if the declaration of the external routine "foo" incorrectly names "a" as an out-parameter and "b" as the in-parameter. In some implementations, out-parameters are handled by indirection, that is, by passing a pointer to the memory location to receive the result of the external routine. When the declaration incorrectly states that an out-parameter is an in-parameter, the external routine is usually passed a value that is not a valid pointer value. When the external routine dereferences the invalid pointer, a segmentation fault occurs and the process crashes.

GENERATING SUBSTITUTE ROUTINES FOR DEBUGGING

Figure 3A:
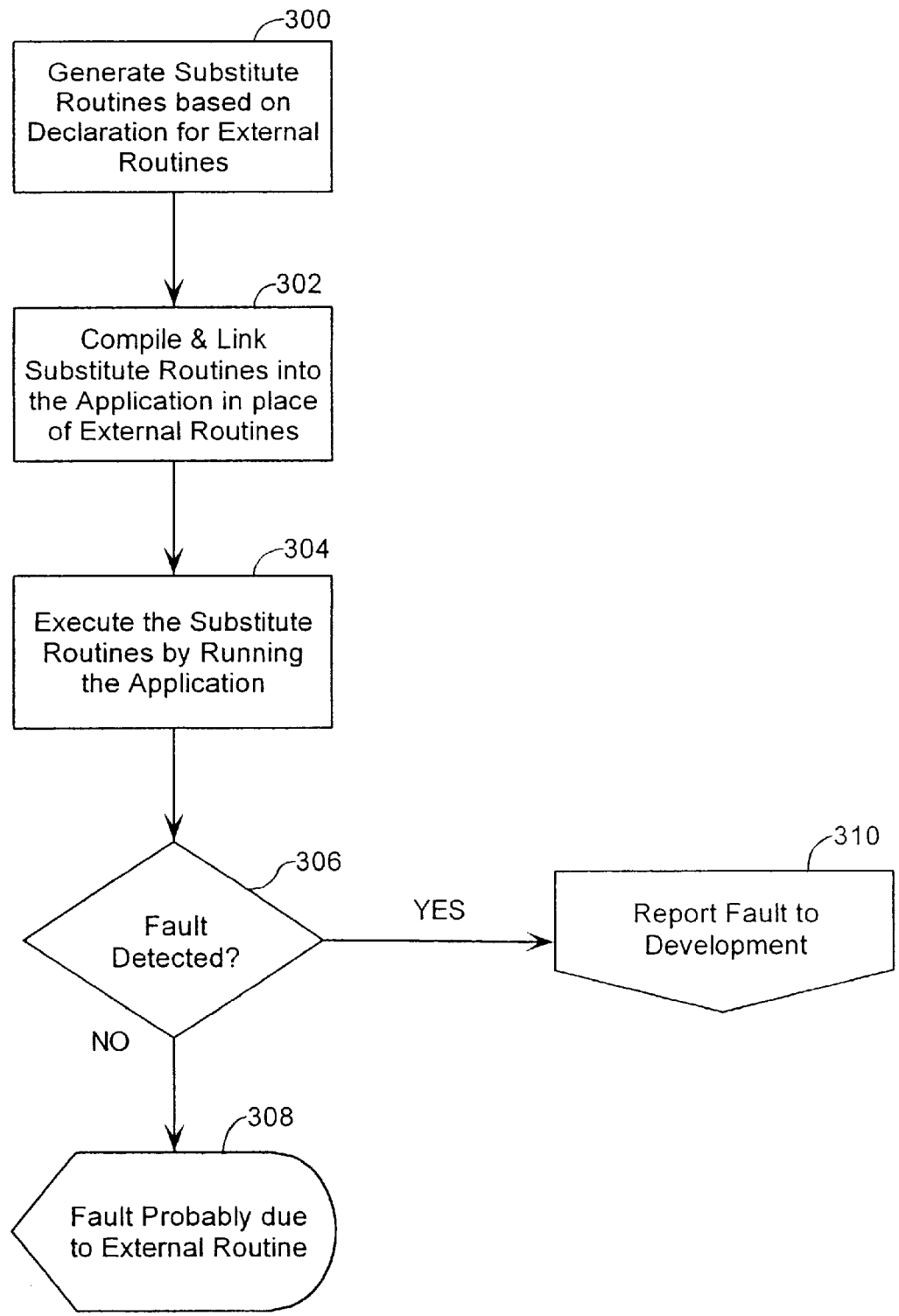
FIG. 3(a) is a flow chart illustrating an operation of debugging faults in a software system with external routines according to an embodiment of the present invention.

Referring to FIG. 3(a), one embodiment of the present invention identifies the probable source of a fault in integrated software by generating replacement, substitute routines based on the declarations for the external routines (step 300). In one embodiment, the substitute routines are automatically generated by a computer program based on a template that specifies a call linkage for entry and exit of the external routine (e.g., initializing stack and frame pointers or setting up a register window). The appropriate call linkage is implementation dependent and often published by platform vendors. The functions of generating the substitute routines can be integrated with the compiler or preprocessor of the source code files 220 and performed in response to a debugging flag, which can be asserted on the command line of the compiler or embedded in the declarations themselves (e.g., adding the string "with debug").

According to one embodiment, the substitute routines generated from the template are configured to validate the values of the in-parameters. Validation involves checking the value to determine whether the value is valid for its type, for example, checking if a pointer value references a valid address. In one embodiment, the substitute routines format and output the values of the in-parameters, based on their types, into a log file or in a window on display 112. The substitute routines can be configured to make another log entry upon exit to indicate that the external routine finished and initialize the out-parameters to an arbitrary value, such as zero (0) or −1 for numbers, the empty string for strings, nil or NULL for pointers, or other value appropriate for the type of the out-parameter.

Figure 2B:
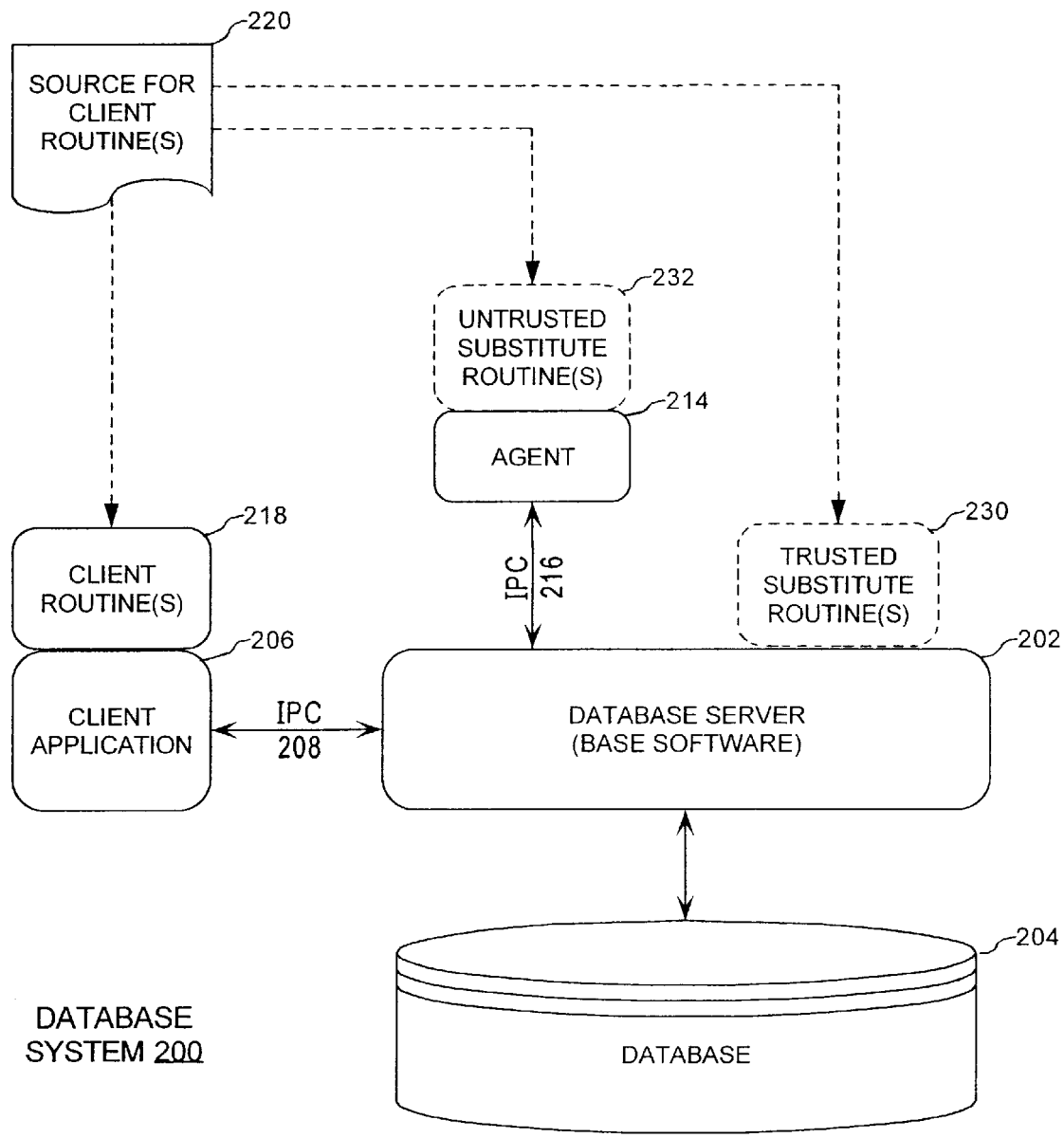
FIG. 2(b) illustrates a diagnostic arrangement for debugging the exemplary software system of FIG. 2(a) according to an embodiment of the present invention.

These substitute routines, when executed, record much information relevant for debugging in a readily usable format. For example, a substitute routine generated on basis of a declaration of "create procedure foo (a in NUMBER, b out NUMBER) is external;" is configured to inspect, validate, and log the value of the "a" parameter and set the "b" parameter to zero. If the external routine "foo" is passed a value of 2 for in-parameter "a", the following line is logged upon entry into the external routine: "enter: foo(a=2, b [out])." In this example, upon exit, the log file contains the line: "exit: foo(a [in], b=0)." Preferably, the entries in the log file consist of ASCII text, which is a format that is much easier to read and print than a core dump. Generating the substitute routines only requires the external routine declarations in the source code 220 as shown in FIG. 2(b), but not the source code 222 and 224 for the external routines 212 and 210, thereby reducing the amount of data that needs to be downloaded from a customer's site to a support site.

In step 302, the substitute routines 230 or 232 are compiled and linked into the base software application 202 in place of the external routines 210 or 212. Preferably, the object code generated for the substitute routines are archived into one or more shared libraries such as a dynamic link library (DLL), and the operating system is directed to use those DLLs instead of the library modules containing the actual external routines. Substitute DLLs 230 for trusted external routines are loaded directly into the base software process 202, and substitute DLLs 232 for untrusted routines are loaded into an agent process 214. Since only the substitute DLLs are needed at the support site, the actual DLLs for the external routines need not be downloaded from the customer's site, thereby reducing download time and respecting the privacy of the customer's source code. Furthermore, the substitute DLLs themselves need not be downloaded from the client site, because they can be generated at the support site from the declarations in the source code 220.

Referring back to FIG. 3(a), the base software application 202 is run so that the substitute routines 230 and 232 are executed (step 304). This step can involve running the client process 206, whose client routines 218 direct the base software 202 via IPC mechanism 208 to invoke external routines specified by declarations in the client source code 220. Since the substitute routines 230 and 232 have been linked into the base software 202 in place of the external routines 210 and 212, directing the base software 202 to invoke the external routines 210 and 212 results in calling the substitute routines 230 and 232.

If the base software process 202 or the agent process 214 linked with the substitute routines 230 or 232 does not crash due to, for example, a segmentation fault, an illegal instruction, or other run-time fault (detected in step 306), then the support group can inform the customer that the fault probably lies within the external routine (step 308). For example, this methodology can identify a declaration mismatch in the external source.

As previously described, if a declaration of the external routine "foo" incorrectly specifies an out-parameter as an in-parameter, there is likely to be a run-time fault because the actual external routine will dereference an invalid reference. However, the substitute routine, generated from the mismatched declaration, will properly handle the values that are passed in, thereby avoiding the dereference of an invalid pointer that caused the run-time error.

If, on the other hand, the base application 202 integrated with the substitute routines 230 or 232 continues to exhibit faulty behavior, then the error probably lies in the base application 202 (step 310). Accordingly, a support group at the support site may send an internal bug report to the developers of the base application 202. Since the problem is present with the substitute routines and reproducible outside the customer site, the developers can debug and fix the problem without having to dial into the customer site, thereby respecting the customer's security concerns.

Dsc IAGNOSINGPorting Errors

The disclosed methodology is also useful in diagnosing porting errors, when the base software application 202 is available on two or more incompatible computer systems. Such porting errors may be due to, for example, incompatible processors or incompatible operating systems. A porting fault is an error that is introduced when adapting a software application developed on one computer platform to run on another computer platform. Many software development companies use a management structure in which base development is separate from the group responsible for adapting or "porting" the base computer application 202 to run on other platforms. It is therefore desirable to identify whether an error in a version of the base software application 202 was introduced during the port or was present all along.

Figure 3B:
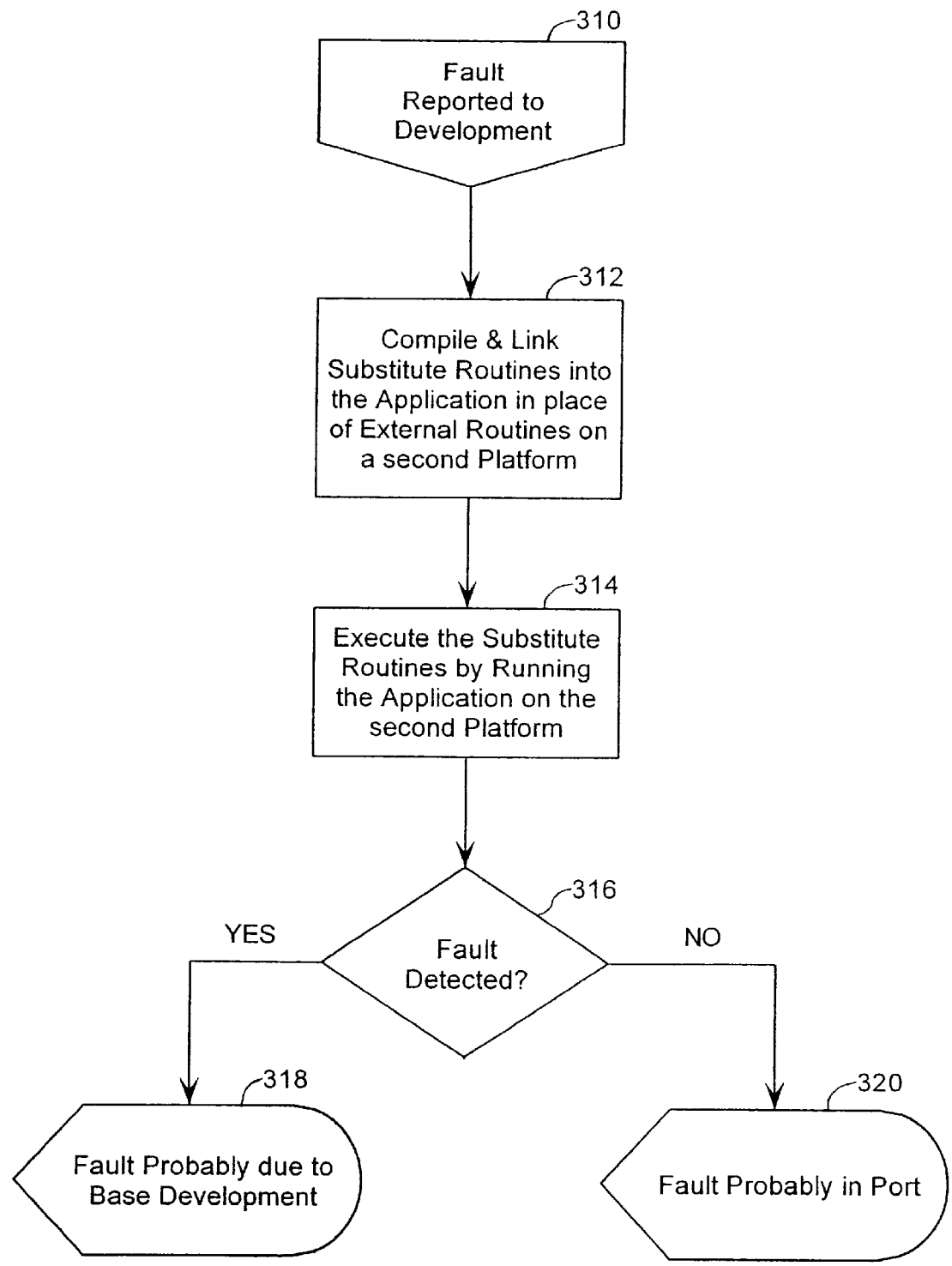
FIG. 3(b) is a flow chart illustrating an operation of debugging porting faults according to an embodiment of the present invention.

According to one embodiment of the present invention, identifying whether a fault is due to a porting error or an error in the original development is performed by reapplying the above-described techniques on a second computer platform that is incompatible with the computer platform to which the port was made. Referring to FIG. 3(b), the substitute routines are compiled for the second platform and linked into a version of the base software application 202 for the second platform in place of the external routines (step 312). These substitute routines are executed on the second platform by running the version of the base software application 202 (step 316).

If the fault continues to occur (detected in step 316), then the fault is probably due to base development (step 318). In this situation, the base development group would be responsible for identifying the exact cause of the fault and devising a fix for it. On the other hand, if the fault is not present at the other platform, then the fault is probably a porting error (step 320). Accordingly, the porting group would become responsible for identify the cause of the fault and devising the fix.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method for debugging a computer application to be used with an external routine, said method comprising the computer-implemented steps of:
    automatically generating an arrangement of instructions based on a declaration of said external routine;
    linking said arrangement of instructions into said computer application in place of said external routine;
    executing said arrangement of instructions by running said computer application on a first computer system; and
    checking for a fault while running said computer application.

2. The method of claim 1, wherein:
    the step of automatically generating an arrangement of instructions based on a declaration of said external routine includes the step of automatically generating a substitute routine based on said declaration; and
    the step of executing said arrangement of instructions by running said computer application includes the step of calling said substitute routine.

3. The method of claim 2, wherein the step of linking said arrangement of instructions into said computer application in place of said external routine includes the step of dynamically linking said substitute routine into said computer application.

4. The method of claim 2, wherein the step of linking said arrangement of instructions into said computer application in place of said external routine includes the step of linking said substitute routine into an agent spawned by said computer application.

5. The method of claim 2, wherein the step of generating a substitute routine based on said declaration includes the step of generating said substitute routine based on a file containing a declaration of the external routine.

6. The method of claim 5, wherein the step of generating said substitute routine based on a file containing a declaration of the external routine includes the step of generating said substitute routine based on a flag within said declaration indicative of a debugging mode.

7. The method of claim 2, wherein:
    the step of calling the substitute routine includes the step of passing a parameter to the substitute routine;
    the step of generating a substitute routine based on said declaration includes the step of generating instructions arranged to validate said parameter.

8. The method of claim 7, wherein the step of generating a substitute routine based on said declaration further includes the step of generating instructions arranged to save a value of said parameter in a log file.

9. The method of claim 2, further comprising the step of receiving a result from the substitute routine, wherein the step of generating a substitute routine based on said declaration includes the step of generating instructions arranged to initialize said result.

10. The method of claim 1, wherein the step of executing said arrangement of instructions by running said computer application on a first computer system includes the step of executing said arrangement of instructions by running a relational database server.

11. The method of claim 1, wherein the step of automatically generating an arrangement of instructions based on a declaration of said external routine includes the step of automatically generating an arrangement of instructions further based on a template.

12. A method for debugging a computer application linked with an external routine, said method comprising the steps of:

relinking said computer application to replace the external routine with an arrangement of instructions generated based on a specification of said external routine;

executing said arrangement of instructions by running said computer application on a first computer system; and checking for a fault while running said computer application.

13. The method of claim 12, wherein the step of executing said arrangement of instructions by running said computer application includes the step of calling a substitute routine.

14. The method of claim 13, wherein the step relinking includes the step of dynamically linking said substitute routine into said computer application.

15. The method of claim 13, wherein the step of relinking includes the step of linking said substitute routine into an agent spawned by said computer application.

16. The method of claim 13, wherein:

the step of calling the substitute routine includes the step of passing a parameter to the substitute routine;

the step of executing said arrangement of instructions includes the step of validating said parameter.

17. The method of claim 16, wherein the step of executing said arrangement of instructions includes the step of saving a value of said parameter in a log file.

18. The method of claim 13, further comprising the step of receiving a result from the substitute routine, wherein the step of executing said arrangement of instructions includes the step of initializing said result.

19. The method of claim 12, wherein the step of executing said arrangement of instructions by running said computer application on a first computer system includes the step of executing said arrangement of instructions by running a relational database server.

20. A method for debugging a computer application to be used with an external routine, said method comprising the computer-implemented steps of:

automatically generating a first arrangement of instructions based on a declaration of said external routine;

linking said first arrangement of instructions into said computer application in place of said external routine;

executing said first arrangement of instructions by running said computer application on a first computer system; and checking for a fault while running said computer application;

detecting said fault on said first computer system;

automatically generating a second arrangement of instructions based on said declaration of said external routine for a second computer system incompatible with said first computer system;

linking said second arrangement of instructions into a version of said computer application for said second computer system;

executing said second arrangement of instructions by running said version of said computer application on said second computer system; and checking for another fault while running said version of said computer application.

21. A method for debugging a computer application formed by linking a plurality of object code modules, a first object code modules of said object code modules including an external routine and a second object code module of said object code modules including an external reference to the external routine, said method comprising the computer-implemented steps of:

relinking the computer application with the second object code module and a substitute object code module in place of the first object code module, said substitute object code module including a substitute routine that is generated based on a specification of said external routine such that the external reference resolves to the substitute routine;

executing said arrangement of instructions by running said computer application; and checking for a fault while running said computer application.

22. A method for localizing a fault exhibited in a computer application linked with an external routine, said method comprising the steps of:

automatically generating an arrangement of instructions based on a declaration of said external routine;

linking said arrangement of instructions into a version of said computer application in place of said external routine;

executing said arrangement of instructions by running said computer application on a first computer system; and checking for the fault while running the version of said computer application;

if the fault is detected while running the version of said computer application then determining that the fault is associated with parts of the computer application other than the external routine; and if the fault is not detected while running the version of said computer application then determining that the fault is associated with the external routine.

* * * * *